(No Model.) 3 Sheets—Sheet 1.
D. B. TANGER.
HAY GATHERER AND ELEVATOR.
No. 405,926. Patented June 25, 1889.
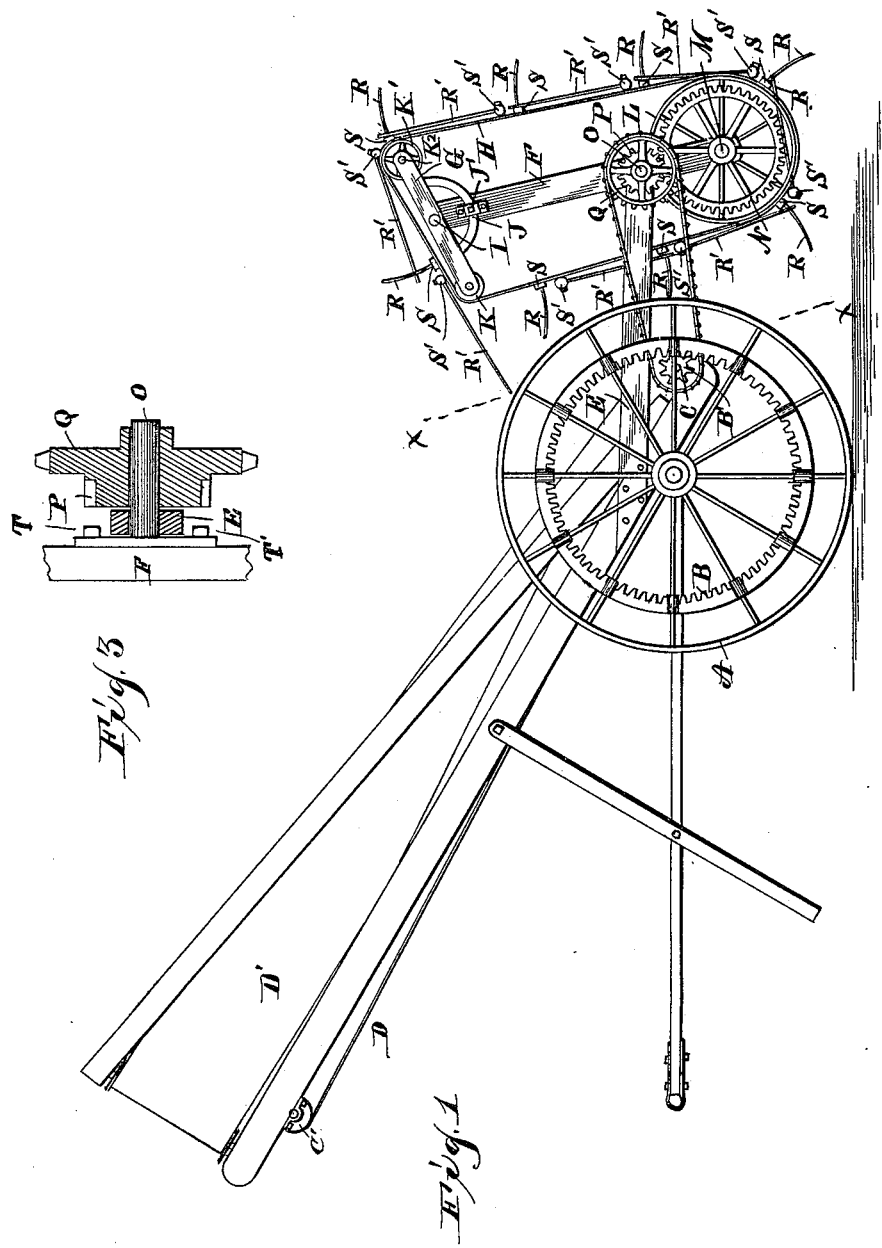
WITNESSES
INVENTOR
David B. Tanger,
Attorney

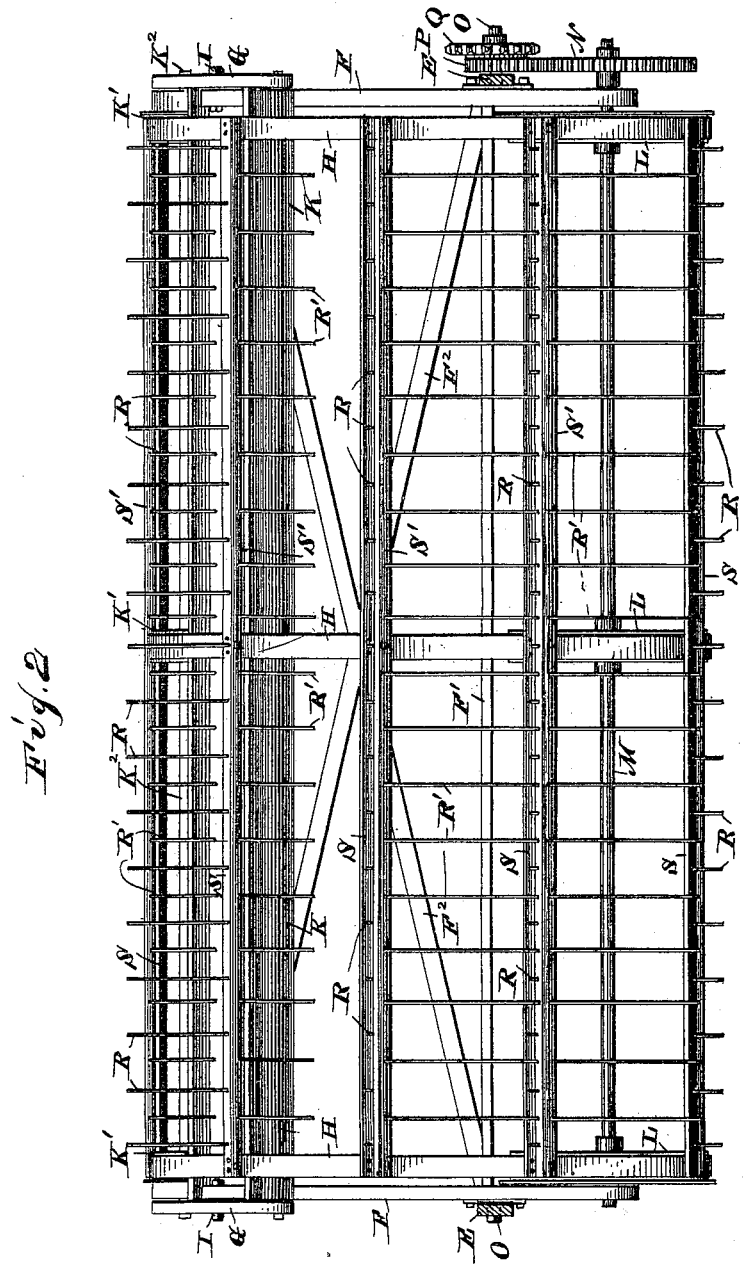

(No Model.) 3 Sheets—Sheet 3.

D. B. TANGER.
HAY GATHERER AND ELEVATOR.

No. 405,926. Patented June 25, 1889.

WITNESSES
Wm H Rowe
Warren Hull

INVENTOR
David B. Tanger,
By
Attorney

UNITED STATES PATENT OFFICE.

DAVID B. TANGER, OF BELLEFONTAINE, OHIO.

HAY GATHERER AND ELEVATOR.

SPECIFICATION forming part of Letters Patent No. 405,926, dated June 25, 1889.

Application filed March 12, 1888. Serial No. 267,046. (No model.)

*To all whom it may concern:*

Be it known that I, DAVID B. TANGER, a citizen of the United States, and a resident of near Bellefontaine, in the county of Logan and State of Ohio, have invented a new and useful Hay Gatherer and Elevator, of which the following is a specification.

This invention relates to certain new and useful improvements in hay gatherers and elevators, being of that class by which the hay is first gathered from the ground and then conducted to the elevating mechanism, by which it is carried and dumped into the wagon, in connection with which this implement is used.

The present invention is designed as an improvement upon the hay-gathering mechanism set forth in Letters Patent No. 329,687, dated November 3, 1885, and granted to me for improvements in hay-loaders.

The present improvements have reference to the manner of mounting the frame which carries the hay-gathering mechanism, whereby the said frame and its incumbent mechanism are free to oscillate on a horizontal axis and are held within the limits of operative position by a preponderance of weight below the supporting-axis; have reference to the manner of arranging the driving-gearing of the gathering mechanism, whereby when the teeth meet an unyielding obstruction the gearing becomes locked against rotation and transfers the power, which, under normal conditions, is utilized to operate the gathering mechanism, to the lower part of the oscillating frame, with a tendency to lift the said part from the ground and clear the teeth of the obstruction, after which, under the gravitating influence of the frame, they will return to normal operative position; have reference to the manner of mounting and operating the stripping and discharging fingers, whereby the said fingers hug closely to the endless belts of the gathering mechanism until the teeth adjacent to their free ends are in position to discharge the hay upon the elevating-belts, when the said fingers are moved lengthwise the teeth and strip and discharge the hay from them, and have reference to certain details of construction and arrangement hereinafter appearing.

Figure 4:
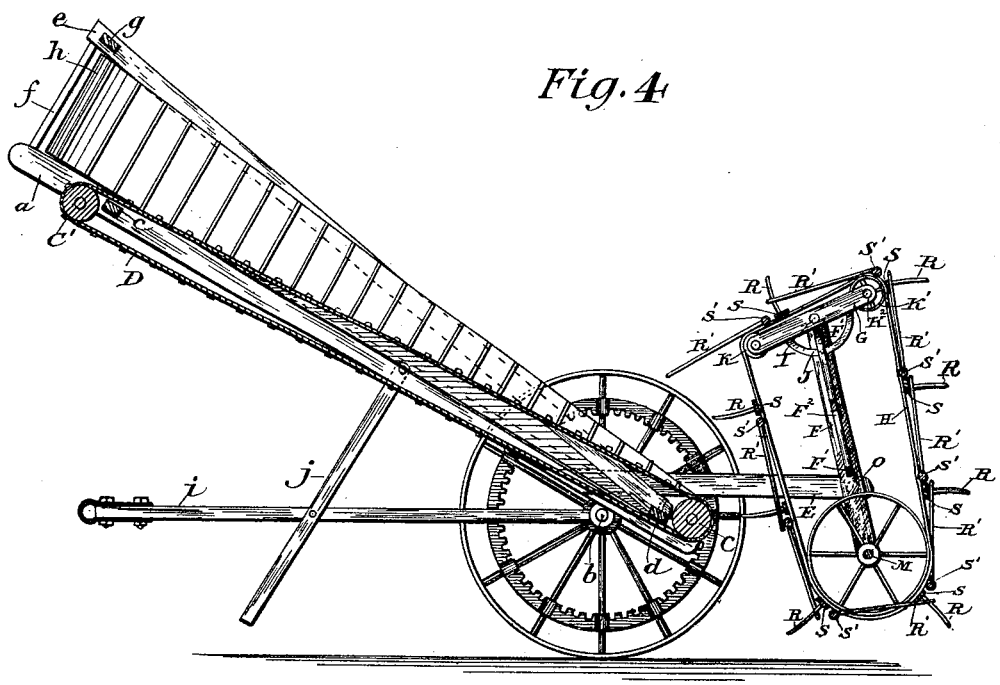
Figure 5:
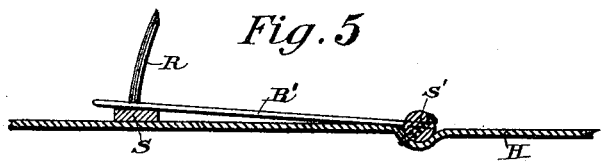

In the accompanying drawings, forming a part of this specification, and on which like reference-letters indicate corresponding parts, Figure 1 represents a side elevation of my improved machine entire; Fig. 2, a sectional view on line $x\ x$ of Fig. 1, looking rearward, and showing the front of the gathering-frame and its mechanism in elevation; Fig. 3, a detail view of a portion of the gathering-frame, one of its supporting-trunnions and the driving sprocket and gear pinions, and one of the supporting-bars in section, two stops for said frame being also illustrated; Fig. 4, a longitudinal vertical sectional view of the apparatus entire; and Fig. 5, a partial sectional and partial elevational view of a part of one of the gatherer-belts, a tooth-bar, one of the teeth, and one of the stripping and discharging fingers and its connecting-bar.

I shall first refer to that part of the machine which elevates the hay and deposits it in the wagon, being constructed, as already intimated, like the corresponding mechanism in the patent hereinbefore recited.

The letter A designates the main wheels carrying internal cog-rims B.

The frame consists of two main pieces $a$, mounted upon an axle $b$, carried by wheels A, which pieces gradually approach each other as they extend forward to a cross-piece $c$, which joins them together, being also joined at their lower ends by a similar piece $d$. The rollers C and C' are journaled in the pieces $a$ and carry the usual elevating-apron D. From a point over the axle on each piece $a$ another piece $e$ rises and extends forward to the front, where it is joined and supported on the piece $a$ by a standard $f$. The pieces $e$ are connected together by the piece $d$ and a similar piece $g$. In the pieces $a$ and $e$ the rollers $h$ are journaled.

D' and D' represent aprons mounted on the roller C and on the rollers $h\ h$, respectively, and are given a quarter-twist after receiving the hay, to deliver it onto the middle belt D. It will readily be seen from this construction that when the aprons D, D', and D² are in position around their rollers they form a sufficient wind-brake to keep the hay from being tossed and tangled by the wind as it is carried upon the aprons. The machine is provided with a tongue *i* and with braces *j*, which connect the pieces *a* with the tongue and form supports to sustain the machine when disconnected from a wagon.

The letter E refers to two side beams rigidly secured to the pieces *a*, or other convenient part of the machine, and extended rearwardly, where they support the bars F, which constitute an essential part of the gatherer-frame. The manner of supporting this frame consists in securing to the bars F trunnions O, which project through bearings in the bars E and turn therein during any oscillation of the frame. One of the trunnions is extended sufficiently beyond the adjacent bar E to afford a stud-shaft O for a sprocket-wheel Q and a prime gear-pinion P, which are preferably integral. Reference will hereinafter be made to the function of these pinions.

To each of the bars F, or to the plate from which project the trunnions, are secured stops T and T', which limit the oscillation of the gatherer-frame by engaging the upper and lower edges of the beams E. These stops may be used upon one of the bars F only, if desired. The frame will generally assume the inclination shown in Fig. 1 when the pole is horizontal, and while in operation the frame will oscillate from this position back and forth according to the condition of the hay, its weight, &c., and according to the inclination of the ground. These bars are connected and braced laterally by bars F' and cross-bars F², as more clearly seen in Fig. 2.

Studs I project from the upper ends of the bars F, and pivotally carry cross-bars G, having each a segment J, which passes through a clip J' on the bar F, and is held by a set-screw or otherwise. In the ends of these bars G are mounted a transverse pulley-shaft K² and a roller K. The shaft K² carries pulleys K'. In the lower ends of the bars F is journaled a similar pulley-shaft M, which carries larger pulleys L. Of the pulleys K' and L there are preferably three, as seen in Fig. 2, and over them are fitted belts H, these belts also passing over the roller K. At suitable intervals the belts are provided with tooth bars or heads S, secured to them in any convenient manner and carrying each a series of gatherer-teeth R. At intermediate points and near each head S are also secured to the belts bars S', carrying each a series of stripping and discharging fingers which extend to and rest upon the head S next following. The manner of arranging the bars S', the belts H, and the stripping and discharging fingers is peculiar, as illustrated in detail in Figs. 4 and 6, from the former of which it will be observed that the fingers are inserted through the bars at an angle to the belts, and from the latter that when the fingers are placed upon the heads S the belt is slightly rolled around the bars S', whereby the tension of the belts is utilized with a tendency to rotate the bars S' and keep the fingers firmly against the heads S. The object of this is to prevent the fingers from dropping down at their free ends as they pass around the pulleys L, which would prevent the proper action of the teeth R.

Referring now to the means of actuating the gatherer, the letter N designates a gear-wheel rigidly mounted on the shaft M and meshing with the prime pinion P, as already referred to.

A pinion B' is mounted on the shaft of the roller C of the elevator and meshes with the cog-rim B, from which it receives rotary motion. Through a sprocket-chain this motion is transmitted to the gatherer mechanism by prime pinions P and sprocket-pinion Q and the gear-wheel N, &c. It will be understood that the gatherer-teeth travel upward at the forward side, and hence move against the hay in the direction in which the machine travels. As the hay accumulates upon them, they rise out of it and carry a quantity upward with them until the stripping and discharging fingers, which precede each particular row of teeth, have passed sufficiently beyond the roller K to be moved at their lower ends lengthwise with the teeth against the hay, which discharges upon the aprons of the elevator, the angle of the belts H passing around the roller K, causing this movement of the fingers, the roller acting as the fulcrum of the fingers during this movement. The tension of the belts already referred to returns the free ends of the fingers against the heads S when they begin to descend at the rear of the machine. The preponderance of weight in the gathering mechanism below the trunnions O gives sufficient pressure to overcome the resistance offered by the hay in lifting it from the ground, whereby the lower ends of the bars F are not swung back too far, while yet they are free to oscillate to and fro on the trunnions according to the varying conditions of the hay as regards its thickness and heft. Should, however, the teeth meet with an unyielding obstruction, then the rotation of the gear N and the pinions P and Q is checked. This practically, but for a few moments only, so locks the gear N and prime pinion P as to constitute of them a means of positive connection between the lower end of the bars F and the sprocket-pinion Q, so that the driving-power being all the while applied to the said sprocket-pinion is transferred to the labor of overcoming the preponderance of the lower part of the gatherer mechanism, and of moving it rearwardly, and consequently of raising the teeth clear of the obstruction. This accomplished, the preponderating weight of the gatherer mechanism automatically returns the teeth to operative position, and at the same time their rotation is recommenced. Thus these two characteristics enter into my invention— namely, an oscillating frame for the gatherer mechanism with a sufficient preponderance of weight below the pivotal axis to hold the said mechanism in operative position against the resistance offered it under ordinary conditions of operation, yet with ability to automatically recede from a given position when the resistance increases and automatically advance from that position when the resistance decreases, which are incidents constantly recurring in the field, and, secondly, the automatic transfer of the driving-power of the gatherer mechanism from the labor of driving said mechanism to that of lifting it away from an obstruction when the obstruction offers enough resistance to stop the rotation of said mechanism.

By adjusting the cross-bars G at different angles to the bars F the angle of the belt in passing over the roller K is changed, consequently the movement of the stripping and discharging fingers varied. The roller K might be substituted by a shaft with pulleys.

Having thus fully described my invention, what I claim as new, and desire to secure by Letters Patent, is—

1. The combination, in a hay-loader, of a frame pivoted at the rear thereof upon a horizontal axis to oscillate freely, a hay-gatherer mechanism carried by said frame, the preponderance of weight thereof being below the pivot of the frame, driving mechanism consisting of wheels or pinions mounted coincidently to the axis of the said pivoted frame, and intermediate devices connecting one of said wheels or pinions with one of the supporting-wheels and the other with the gatherer mechanism.

2. The combination, with a hay-loader having rearwardly-extending supports, of a frame pivoted thereon on trunnions, so as to oscillate, a roller and a shaft having pulleys, both supported by the upper end of said frame in different vertical planes, a shaft supported by said frame below the trunnions and having pulleys, endless belts carried by said roller and pulleys, gatherer-teeth and stripping and discharging fingers carried by said belts, the former at about a right angle to the belts and the latter normally lengthwise with the belts, whereby the fingers are moved at their free ends in the direction of the length of the teeth by the bends of the belts as they travel over the roller, and driving mechanism connecting one of said shafts with one of the supporting-wheels of the loader.

3. The combination, in a hay-loader, of a frame pivoted at the rear thereof upon a horizontal axis, so as to oscillate freely, hay-gatherer mechanism carried by said frame, the preponderance of the weight thereof being below the pivot of the frame, and driving-gearing, the prime pinion of which has its axis of rotation coincident to the axis of the frame, whereby upon a lock of the gearing, occasioned by an obstruction to the teeth, the driving-power is transferred to elevate the teeth.

4. The combination, in a hay-loader having rearwardly-extending supports, of a frame carried by said supports and upon trunnions and free to oscillate, a roller and shafts having pulleys carried by said frame, the roller and one of the shafts by the upper end and the other shaft by the lower end, endless belts carried by said roller and shafts, gatherer-teeth and stripping and discharging fingers carried by said belts, the former at about a right angle to the belts and the latter normally lengthwise to the belts, whereby the fingers are moved lengthwise of the teeth at their free ends by the bends in the belts as they go over the roller, a gear-wheel mounted on one of said shafts, a meshing-pinion and a sprocket-pinion mounted on one of said trunnions, and a sprocket-chain on the latter pinion driven by a gear rim and pinion actuated by one of the supporting-wheels.

5. In a hay-loader, the combination, with the rearwardly-extending supports, of a frame mounted therein upon trunnions and free to rock on said trunnions, a roller, and a shaft having pulleys carried by the upper ends of said frame, a shaft having pulleys carried by the lower ends of said frame, belts carrying teeth, and stripping and discharging fingers mounted upon said belts, the preponderance of the weight of the lower shaft, its pulleys, and the lower end of the frame being below the trunnions.

6. The combination, in a hay-loader having rearwardly-extending supports and a frame mounted thereon to rock freely upon trunnions, of a roller, and shafts having pulleys carried by said frame, belts carrying teeth and stripping and discharging fingers, said devices being arranged with the preponderance of weight below the trunnions, a gear-wheel on the lower of said shafts, and a driving-pinion on one of said trunnions, whereby the roller and pulleys are rotated, and whereby, when the teeth are obstructed and the revolution of the gear-wheel and belts is stopped, the power applied to them is transferred, through the pinion and gear-wheel, to the lower end of the frame to move it upward and rearward on the trunnions.

7. In a hay-loader, the combination, with the rearwardly-extending supports, of a frame mounted therein and upon trunnions and consisting of side bars, a cross-bar pivoted to the upper end of each side bar, a roller mounted in one end of the cross-bars, and a shaft carrying pulleys mounted in the other end, and a shaft mounted in the lower ends of said side bars and carrying larger pulleys, belts fitted to said rollers and pulleys, teeth projecting at about right angles to said belts, and stripping and discharging fingers lying along and secured at one end on said belts, the other and free ends of the fingers being adjacent to the teeth, whereby as the fixed ends of the fingers pass over the roller and the angle of the belts is changed the fingers are actuated away from the teeth.

8. The combination, with the frame of a hay-loader, of a gatherer-frame consisting of side bars, cross-bars pivoted thereto at one end and having segments and fastening devices to lock them in different positions, a roller, and a shaft having pulleys mounted in said cross-bars, a shaft having pulleys mounted in said side bars, and belts carried by said roller and pulleys and having teeth and stripping and discharging fingers.

9. The combination, with a hay-gatherer belt, of teeth carried thereby, and stripping and discharging fingers lying along and lengthwise the belts and secured to a bar, which is fastened to the belt by an inclined rivet, so that the tension of the belts tends to draw the free ends of the fingers toward the belts.

DAVID B. TANGER.

Witnesses:
W. J. KNIGHT,
J. Q. A. CAMPBELL.